(12) United States Patent
Toyooka et al.

(10) Patent No.: US 11,333,429 B2
(45) Date of Patent: May 17, 2022

(54) REFRIGERATION DEVICE

(71) Applicant: PHC HOLDINGS CORPORATION, Tokyo (JP)

(72) Inventors: Takashi Toyooka, Saitama (JP); Eiichi Mori, Ehime (JP); Jun Yoshioka, Ehime (JP)

(73) Assignee: PHC HOLDINGS CORPORATION, Tokyo (JP)

( * ) Notice: Subject to any disclaimer, the term of this patent is extended or adjusted under 35 U.S.C. 154(b) by 214 days.

(21) Appl. No.: 16/547,196

(22) Filed: Aug. 21, 2019

(65) Prior Publication Data

US 2019/0376737 A1    Dec. 12, 2019

Related U.S. Application Data

(63) Continuation of application No. PCT/JP2018/017861, filed on May 9, 2018.

(30) Foreign Application Priority Data

May 23, 2017  (JP) .............................. JP2017-101960

(51) Int. Cl.
| | | |
|---|---|---|
| *F25D 23/06* | (2006.01) | |
| *F25B 6/02* | (2006.01) | |
| *F25B 7/00* | (2006.01) | |

(52) U.S. Cl.
CPC .............. *F25D 23/068* (2013.01); *F25B 6/02* (2013.01); *F25B 7/00* (2013.01); *F25D 23/061* (2013.01); *F25D 2201/10* (2013.01); *F25D 2201/12* (2013.01); *F25D 2321/146* (2013.01); *F25D 2321/1412* (2013.01)

(58) Field of Classification Search
CPC .......... F25B 7/00; F25B 6/04; F25B 2400/06; F25B 6/02; F25D 19/04; F25D 23/068; F25D 23/061; F25D 2201/12
See application file for complete search history.

(56) References Cited

U.S. PATENT DOCUMENTS

| | | | |
|---|---|---|---|
| 3,966,283 A * | 6/1976 | Puterbaugh | ........... F25D 23/061 312/406 |
| 5,693,685 A | 12/1997 | Kishimoto et al. | |
| 7,677,681 B2 * | 3/2010 | Cheon | ..................... F25D 23/12 312/406 |

(Continued)

FOREIGN PATENT DOCUMENTS

| | | |
|---|---|---|
| JP | S54-021658 A | 2/1979 |
| JP | 61-021285 U | 2/1986 |
| JP | 61-168772 A | 7/1986 |

(Continued)

OTHER PUBLICATIONS

Extended European Search Report dated Apr. 2, 2020 for the corresponding European Patent Application No. 18805971.1.

(Continued)

*Primary Examiner* — Lionel Nouketcha
(74) *Attorney, Agent, or Firm* — McDermott Will and Emery LLP

(57) ABSTRACT

This refrigeration device is provided with: an evaporator configuring a refrigeration circuit; a cascade condenser configuring the refrigeration circuit; and a thermal insulation board arranged between the evaporator and the cascade condenser.

8 Claims, 10 Drawing Sheets

(56) References Cited

U.S. PATENT DOCUMENTS

| | | | |
|---|---|---|---|
| 2007/0028646 A1 | 2/2007 | Oshitani et al. | |
| 2011/0023532 A1 | 2/2011 | Kobayashi et al. | |

FOREIGN PATENT DOCUMENTS

| | | | | |
|---|---|---|---|---|
| JP | 07-053769 A | | 2/1995 | |
| JP | 08-145279 A | | 6/1996 | |
| JP | 09-012760 A | | 1/1997 | |
| JP | 2000-105047 A | | 4/2000 | |
| JP | 2000105047 A | * | 4/2000 | |
| JP | 2004-085103 A | | 3/2004 | |
| JP | 2007-040586 A | | 2/2007 | |
| JP | 2007-198622 A | | 8/2007 | |
| JP | 2007-218459 A | | 8/2007 | |
| JP | 2008-234139 A | | 10/2008 | |
| JP | 2010-065925 A | | 3/2010 | |
| JP | 2011058657 A | * | 3/2011 | ........... F25D 23/068 |
| JP | 2011-102599 A | | 5/2011 | |
| JP | 2012-007781 A | | 1/2012 | |
| JP | 2012-063038 A | | 3/2012 | |
| JP | 2012063038 A | * | 3/2012 | |
| WO | 2017-033680 A1 | | 3/2017 | |

OTHER PUBLICATIONS

International Search Report and Written Opinion issued in International Patent Application No. PCT/JP2018/017861, dated Jul. 17, 2018; with partial English translation.

\* cited by examiner

REFRIGERATION DEVICE

CROSS-REFERENCE OF RELATED APPLICATIONS

This application is the U.S. Continuation of International Patent Application No. PCT/JP2018/017861, filed on May 9, 2018, which in turn claims the benefit of Japanese Application No. 2017-101960, filed on May 23, 2017, the entire disclosures of which Applications are incorporated by reference herein.

TECHNICAL FIELD

The present invention relates to a refrigeration apparatus.

BACKGROUND ART

Conventionally, a cascade refrigeration apparatus is used as a refrigeration apparatus such as an ultra-low temperature freezer whose in-compartment temperature reaches, for example, −85° C. The cascade refrigeration apparatus includes a high-temperature side refrigeration circuit, a low-temperature side refrigeration circuit, and a heat exchanger configured to exchange heat between refrigerants that flow through these refrigeration circuits. As a refrigeration apparatus such as an ultra-low temperature freezer, another refrigeration apparatus is used which includes a heat exchanger configured to exchange heat between a low-temperature refrigerant and a gas-side refrigerant, the low-temperature refrigerant being obtained by liquid-gas separating a refrigerant in a refrigeration circuit and expanding a liquid-side refrigerant. These heat exchangers are called a cascade condenser.

In these cascade refrigerators, a refrigerant circulating through a high-temperature-side refrigeration circuit (hereinafter, referred to as a "high-temperature-side refrigerant") evaporates at the cascade condenser, and heat is removed from a refrigerant circulating through a low-temperature-side refrigeration circuit (hereinafter, referred to as a "low-temperature-side refrigerant") at the cascade condenser. At this time, the low-temperature-side refrigerant is condensed and liquefied. Additionally, the low-temperature-side refrigerant evaporates within an evaporator that makes up the low-temperature-side refrigeration circuit to thereby cool an interior of a refrigeration compartment situated adjacent to the evaporator.

One cascade refrigeration apparatus is disclosed in PTL 1. This cascade refrigeration apparatus includes a heat insulation box body packed with a foamed heat insulating material. An intermediate heat exchanger (a cascade condenser) is provided inside the heat insulation box body. A refrigeration compartment is disposed on the heat insulation box body, and a first evaporator (an evaporator) is disposed on a back surface of the refrigeration compartment.

CITATION LIST

Patent Literature

PTL 1
Japanese Patent Application Laid-Open No. 2012-7781

SUMMARY OF INVENTION

Technical Problem

Although the cascade refrigeration apparatus described in PTL 1 has the configuration described above, heat insulation between the cascade condenser and the evaporator is effected by part of the foamed heat insulating material packed in the heat insulating box body, as illustrated in FIG. 1 of PTL 1. The study carried out by the inventor and others makes it clear that this heat insulation structure involves the following problems.

That is, it has been found out that the heat insulating material cannot be packed sufficiently between an inner box that makes up the heat insulation box body and the cascade condenser, generating a non-packed portion where the heat insulating material is not packed and/or an insufficiently packed portion where the heat insulating material is insufficient and is packed thin in that portion from time to time.

In such a state, a heat transmission is caused between the cascade condenser which is supplied with the low-temperature-side refrigerant discharged from the compressor and heated to a high temperature and the evaporator which is supplied with the low-temperature-side refrigerant passed through a throttle expansion device such as an expansion valve and cooled to a low temperature. When such a heat transmission is caused, the performance of the cascade refrigeration apparatus is reduced.

Such a reduction in performance due to the occurrence of a heat transmission between a cascade condenser and an evaporator is not limited to a cascade refrigeration apparatus but is a common problem to refrigeration apparatuses including a cascade condenser.

An object of the present invention, which has been made in view of these situations, is to provide a refrigeration apparatus which can reduce a heat transmission between a cascade condenser and an evaporator.

Solution to Problem

A refrigeration apparatus according to the present invention includes: an evaporator that makes up a refrigeration circuit; a cascade condenser that makes up the refrigeration circuit; and a heat insulating board disposed between the evaporator and the cascade condenser.

Advantageous Effects of Invention

According to the present invention, the refrigeration apparatus can be provided in which the heat transmission between the cascade condenser and the evaporator can be reduced.

DESCRIPTION OF EMBODIMENTS

Embodiments of the present invention will be described in detail with reference to accompanying drawings. The following embodiments are examples, and the present invention is not limited by these embodiments in any way.

Embodiment 1

Figure 1:
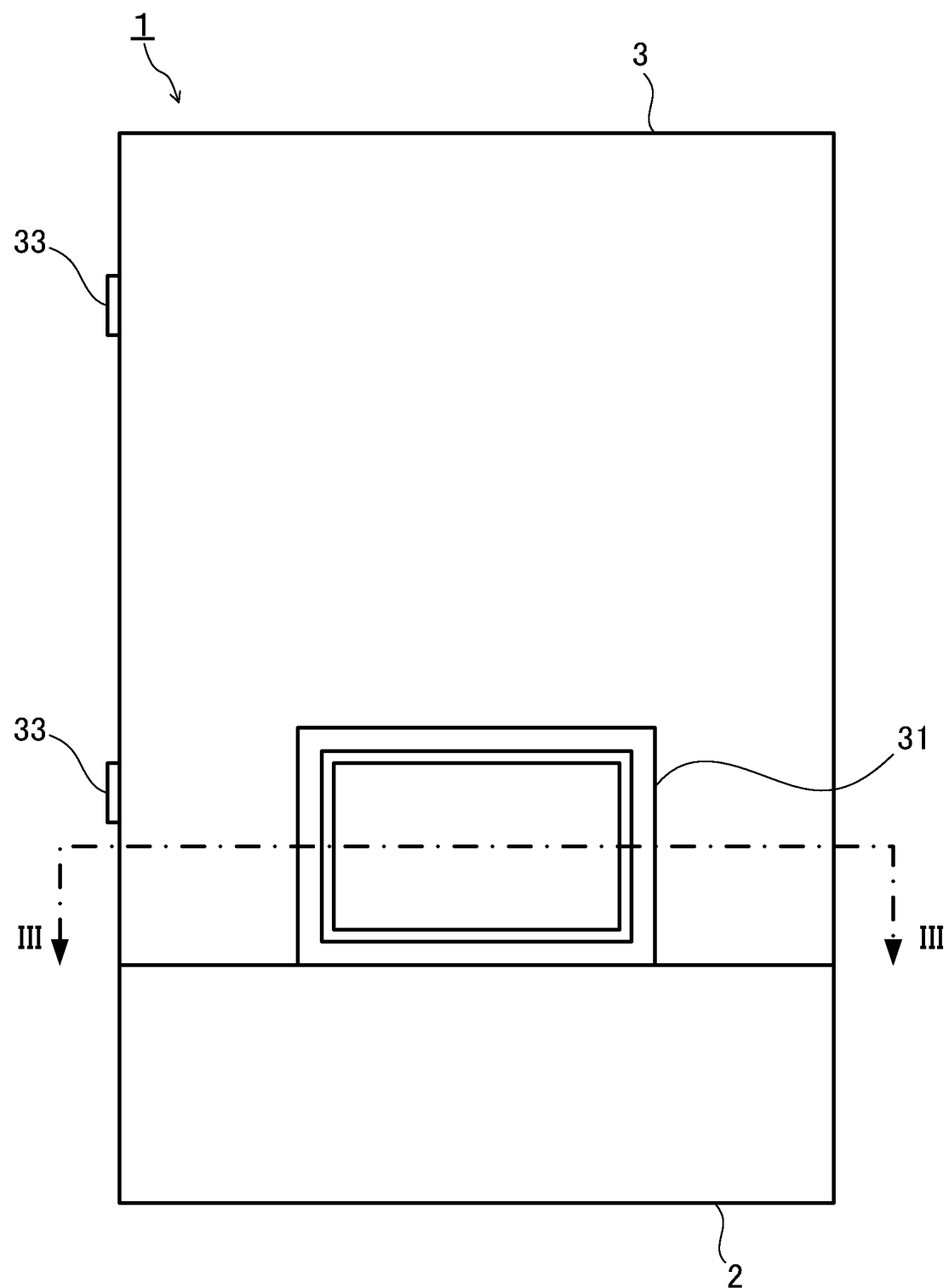
FIG. 1 is a rear view of a refrigeration apparatus according to Embodiment 1.

FIG. 1 is a rear view of a refrigeration apparatus according to Embodiment 1. Refrigeration apparatus 1 includes machine installing section 2 and main body 3 provided thereon.

Various devices and a control section that make up refrigeration circuit 60 (refer to FIG. 2) are disposed in an interior of machine installing section 2. Refrigeration circuit 60 and the various devices that make up refrigeration circuit 60 will be described in detail later.

On a rear surface of main body 3, cascade condenser disposition section 39 (to be described later) where first cascade condenser 616 (to be described later), second cascade condenser 626 (to be described later), and the like are disposed is provided, and lid 31 configured to close cascade condenser disposition section 39 is attached.

Figure 2:
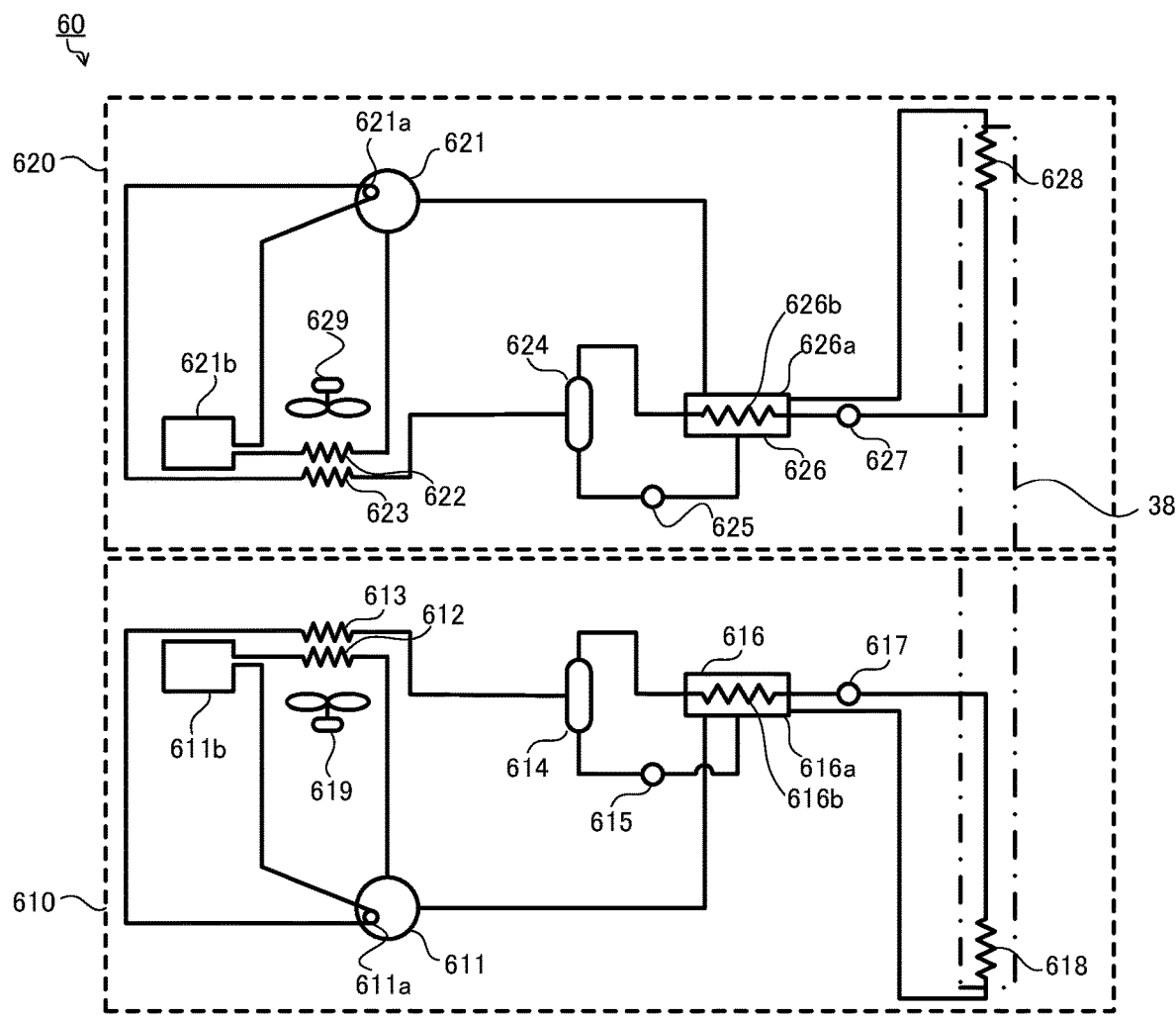
FIG. 2 is a circuit diagram illustrating refrigeration circuits and constituent devices thereof.

FIG. 2 is a cycle diagram illustrating main constituent devices that makes up refrigeration circuit 60. Refrigeration circuit 60 includes first refrigeration circuit 610 and second refrigeration circuit 620 in which refrigerants circulate independently of each other. First refrigeration circuit 610 and second refrigeration circuit 620 can both be operated simultaneously. Alternatively, only either of first refrigeration circuit 610 and second refrigeration circuit 620 can also be operated for the sake of energy conservation or service maintenance of the other.

First refrigeration circuit 610 includes first compressor 611, first pre-condenser 612 and first condenser 613, first separator 614 configured to separate a refrigerant into gas and liquid, first auxiliary decompression device 615 and first cascade condenser 616, and first decompression device 617 and first evaporator pipe 618. These constituent devices are connected together with a predetermined piping (a first piping) so that a refrigerant (a first refrigerant) discharged from first compressor 611 returns to first compressor 611. For example, a non-azeotropic mixture refrigerant containing four different refrigerants (hereinafter, referred to simply as a "refrigerant") is sealed in first refrigeration circuit 610.

First refrigeration circuit 610 includes first oil cooler 611a in an oil reservoir in first compressor 611 and includes first annular piping 611b between first pre-condenser 612 and first oil cooler 611a.

First compressor 611 compresses a sucked refrigerant and discharges the refrigerant to first pre-condenser 612.

First pre-condenser 612 is made up, for example, of a serpentine copper or aluminum pipe configured to dissipate heat from the refrigerant discharged from first compressor 611.

First condenser 613 is made up, for example, of a serpentine copper or aluminum pipe configured to dissipate heat further from the refrigerant outputted from first pre-condenser 612.

First pre-condenser 612 and first condenser 613 are integrated into, for example, a single pipe plate. First common fan 619 is disposed near first pre-condenser 612 and first condenser 613 to blow air against first pre-condenser 612 and first condenser 613 simultaneously.

First separator 614 separates the refrigerant outputted from first condenser 613 into a liquid-phase refrigerant and a gas-phase refrigerant. After having been so separated, the liquid-phase refrigerant is decompressed in first auxiliary decompression device 615 (for example, a capillary tube), whereafter the decompressed refrigerant evaporates in first outer pipe 616a of first cascade condenser 616.

First cascade condenser 616 is made up, for example, of a copper or aluminum duplex pipe including first outer pipe 616a and first inner pipe 616b. The gas-phase refrigerant from first separator 614 flows into first inner pipe 616b. In first outer pipe 616a, the liquid-phase refrigerant evaporates to cool the gas-phase refrigerant flowing through first inner pipe 616b.

First decompression device 617 (for example, a capillary tube) decompresses a refrigerant that is cooled in first inner pipe 616b of first cascade condenser 616 to be in a liquid phase and outputs the decompressed refrigerant to first evaporator pipe 618.

First evaporator pipe 618 is made up, for example, of a copper or aluminum pipe configured to evaporate the refrigerant decompressed in first decompression device 617 and is thermally affixed to an outer surface of inner box 35 (refer to FIG. 3) that makes up main body 3 excluding an opening thereof in such a manner as to be in contact with the outer surface. First evaporator pipe 618 makes up evaporator pipe 38 together with second evaporator pipe 628, which will be described later.

An interior of inner box 35 is cooled by a cooling effect produced when the refrigerant evaporates (vaporizes) in first evaporator pipe 618. The refrigerant that evaporates in first evaporator pipe 618 to be in a gas-phase merges with the refrigerant that has evaporated beforehand in first cascade condenser 616, and both the refrigerants are sucked into first compressor 611.

Second refrigeration circuit 620 has a similar configuration to that of first refrigeration circuit 610. That is, second refrigeration circuit 620 includes second compressor 621, second pre-condenser 622 and second condenser 623, second separator 624 configured to separate a refrigerant into liquid and gas, second auxiliary decompression device 625 and second cascade condenser 626, and second decompression device 627 and second evaporator pipe 628. Constituent devices are connected together by a predetermined piping (a second piping) in such a manner that a refrigerant (a second refrigerant) discharged from second compressor 621 returns to second compressor 621 again. A similar refrigerant to the refrigerant used in first refrigeration circuit 610 is also used in second refrigeration circuit 620.

Similar to first refrigeration circuit 610, second refrigeration circuit 620 includes second oil cooler 621a, and a second annular piping 621b. Second cascade condenser 626 includes second outer pipe 626a and second inner pipe 626b.

Second pre-condenser 622 and second condenser 623 are integrated into, for example, a single pipe plate. Second common fan 629 is disposed near second pre-condenser 622 and second condenser 623 to blow air against second pre-condenser 622 and second condenser 623 simultaneously.

First annular piping 611*b* and second annular piping 621*b* are provided on a circumference of the opening in main body 3. This circumferential portion of the opening constitutes a portion where condensation or frosting tends to be generated easily. However, since a refrigerant of a relatively high temperature flows through first annular piping 611*b* and second annular piping 621*b*, the circumferential portion of the opening in main body 3 can be heated, thereby making it possible to prevent the occurrence of condensation or frosting.

In refrigeration apparatus 1 configured as has been described heretofore, cooling compartment 32 (which will be described later) is cooled by first refrigeration circuit 610 and/or second refrigeration circuit 620, or specifically the refrigerants flowing in the interiors of first evaporator pipe 618 and second evaporator pipe 628 or the refrigerant flowing in the interior of first evaporator pipe 618 or second evaporator pipe 628.

Figure 3:
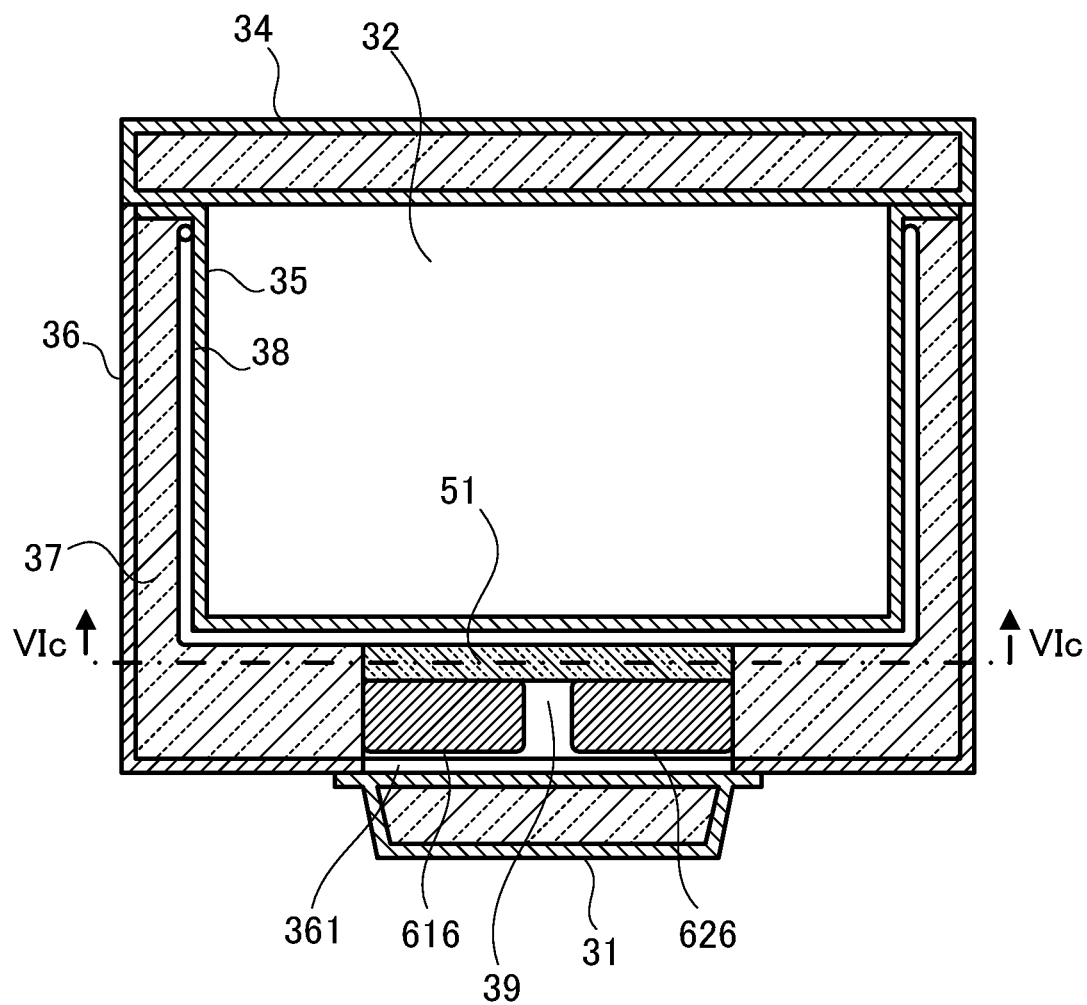
FIG. 3 is a cross-sectional view taken along line III-III and viewed in a direction indicated by arrows III of FIG. 1.

FIG. 3 illustrates a cross-sectional view taken along line III-III and viewed in a direction indicated by arrows III in FIG. 1. Main body 3 includes inner box 35 made up of an iron plate and opened at a front thereof, outer box 36 made up of an iron plate and opened at a front thereof, and heat insulating material 37 packed in a space defined between inner box 35 and outer box 36. Heat insulating material 37 is formed from a spongy resin that is supplied in the form of mousse-like liquid and is then solidified to have a number of independent cells, for example, foamed urethane. Cooling compartment 32 where cooling target articles are installed is formed in an interior of inner box 35. Door 34 is attached to outer box 36 via hinges 33 (refer to FIG. 1) in such a manner as to be opened and closed. Door 34 is a plate-like member of a structure in which an arbitrary heat insulating member is surrounded by an iron plate. First annular piping 611*b* and second annular piping 621*b* are not illustrated in the figure.

Figure 4:
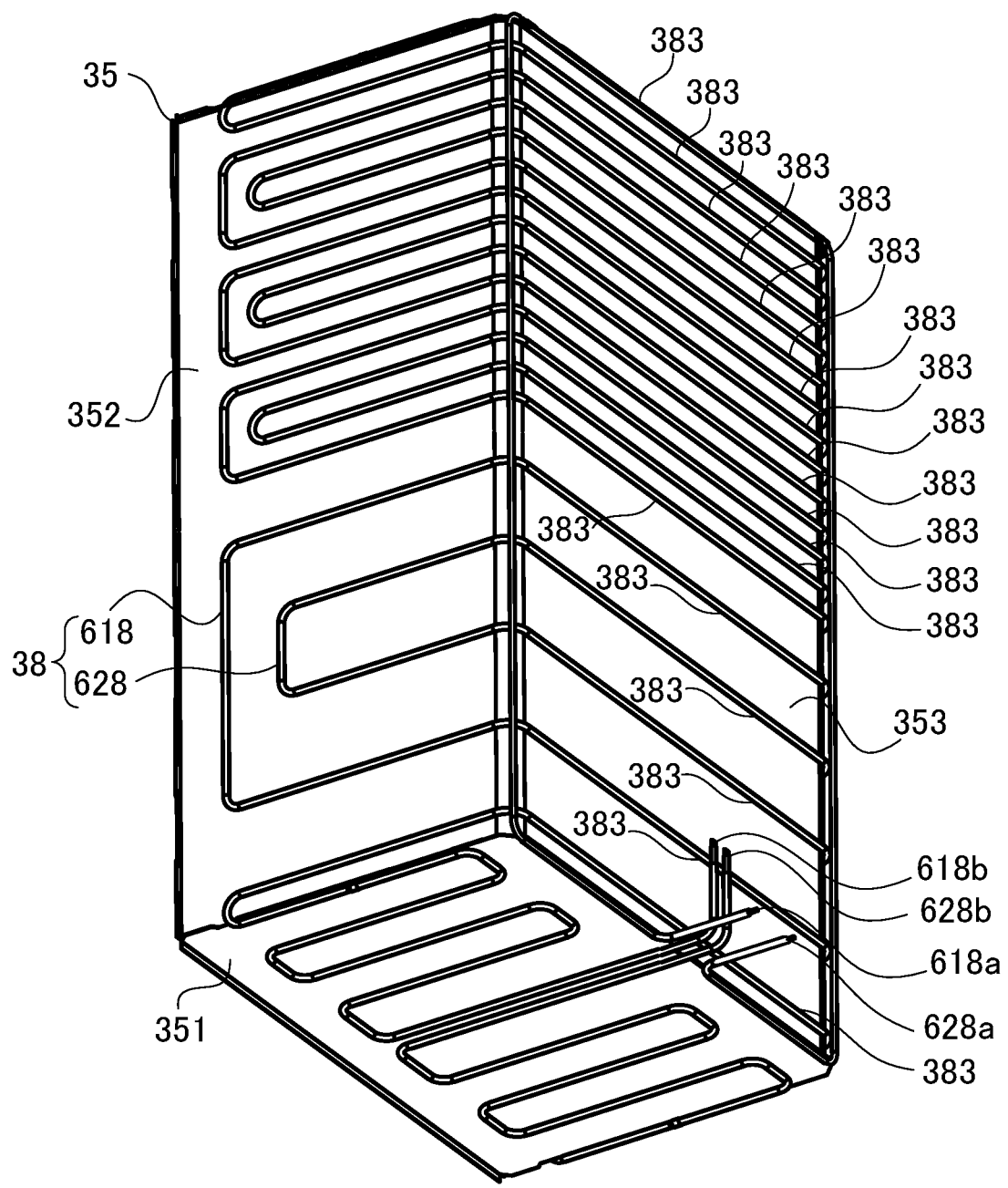
FIG. 4 is a perspective view of an inner box and an evaporator.

FIG. 4 is a perspective view of inner box 35 as viewed from a rear and below. As illustrated in FIG. 4, first evaporator pipe 618 and second evaporator pipe 628, which make up evaporator pipe 38, are laid out on an outer surface of inner box 35 in such a manner as to surround inner box 35, that is, cooling compartment 32 illustrated in FIG. 3. First evaporator pipe 618 and second evaporator pipe 628 individually include a plurality of straight pipe sections 383.

First evaporator pipe 618 and second evaporator pipe 628 are provided along the outer surface, specifically, lower surface 351, right surface 352, rear surface 353, a left surface (not shown), and an upper surface (not shown) of inner box 35 in such a manner as to be in contact therewith. First evaporator pipe 618 and second evaporator pipe 628 are attached to the outer surface of inner box 35 with, for example, a metal tape (not shown) of aluminum or the like on one side of which an adhesion layer is provided. First evaporator pipe 618 includes first evaporator pipe inlet 618*a* and first evaporator pipe outlet 618*b*. Second evaporator pipe 628 includes a second evaporator pipe inlet 628*a* and second evaporator pipe outlet 628*b*.

FIG. 3 is referred to again. As illustrated in FIG. 3, cascade condenser disposition section 39 is provided on the rear surface of main body 3. Cascade condenser disposition section 39 is provided in a position at outer side of inner box 35 and an inner side of outer box 36. Cascade condenser disposition section 39 is surrounded on upper, lower, left, and right sides thereof with heat insulating material 37 packed between inner box 35 and outer box 36.

Cascade condenser disposition section 39 includes a resting section (not shown) where first cascade condenser 616 and second cascade condenser 626 are rested. First evaporator pipe inlet 618*a*, first evaporator pipe outlet 618*b*, second evaporator pipe inlet 628*a*, and second evaporator pipe outlet 628*b* are disposed in cascade condenser disposition section 39. Additionally, first decompression device 617 and second decompression device 627 are disposed in cascade condenser disposition section 39. First evaporator pipe inlet 618*a* is connected to first cascade condenser 616 (first inner pipe 616*b*) via first decompression device 617. First evaporator pipe outlet 618*b* is connected to first compressor 611 via first cascade condenser 616 (first outer pipe 616*a*). Second evaporator pipe inlet 628*a* is connected to second cascade condenser 626 (second inner pipe 626*b*) via second decompression device 627. Second evaporator pipe outlet 628*b* is connected to second compressor 621 via second cascade condenser 626 (second outer pipe 626*a*).

In refrigeration apparatus 1 according to this embodiment, hole 361 is provided in outer box 36. A position where hole 361 is provided matches a rear surface side of cascade condenser disposition section 39.

Part of evaporator pipe 38, heat insulating board 51, first cascade condenser 616 and second cascade condenser 626 are disposed sequentially from an inner box 35 side to an outer box 36 side in cascade condenser disposition section 39. Heat insulating board 51 is fixed to rear surface 353 of inner box 35 with, for example, an adhesive tape (not shown). First cascade condenser 616 and second cascade condenser 626 are disposed to be aligned side by side. Cascade condenser disposition section 39 is closed with lid 31 after the devices are installed in cascade condenser disposition section 39. Lid 31 is detachably attached to outer box 36 with bolts, not shown, or the like and is detached from outer box 36 for service maintenance of first cascade condenser 616 or second cascade condenser 626. Lid 31 is a plate-like member having a structure in which an arbitrary heat insulating member is surrounded by an iron plate.

Heat insulating board 51 is a resin plate member formed in advance using a known method in a factory or the like and having a number of independent cells in an interior thereof and is formed of, for example, a hard polyurethane. Heat insulating board 51 may be formed of any material, as long as the material has sufficient heat insulating properties and rigidity enabling heat insulating board 51 to maintain its plate-like shape and may be, for example, a so-called vacuum heat insulating material that is a member containing glass fibers as a core material or member in which a vacuum heat insulating material and a plate member having sufficient rigidity are laminated on each other.

Heat insulating board 51 is sized and shaped so that first cascade condenser 616 and second cascade condenser 626 are hidden behind heat insulating board 51 to become invisible when heat insulating board 51, first cascade condenser 616, and second cascade condenser 626 are disposed in cascade condenser disposition section 39 and these devices are seen from a front side of refrigeration apparatus 1. Thus, heat insulating board 51 is interposed between first and second cascade condensers 616, 626 and evaporator pipe 38 to interrupt heat transmission therebetween, thereby making it possible to reduce the heat transmission in an ensured fashion.

Heat insulating board 51 preferably has a thickness of 10 mm to 20 mm. Having the thickness of 10 mm or greater, heat insulating board 51 can obtain sufficiently great heat insulating properties and mechanical strength (rigidity). Heat insulating board 51 having the thickness of 20 mm or smaller, a ratio of a space in a thickness direction to a space (cascade condenser disposition section 39) defined between inner box 35 and outer box 36 can be reduced to a relatively small level, whereby a space where to install first cascade condenser 616 and second cascade condenser 626 can be secured sufficiently. In the case where the vacuum heat insulating material is used, with a thickness of the order of 1 mm, sufficient heat insulating properties can be obtained.

Heat insulating board 51 has preferably a heat transmissivity of 0.050 W/(m·K) or smaller, more preferably a heat transmissivity of 0.030 W/(m·K) or smaller, and much more preferably a heat transmissivity of 0.024 W/(m·K) or smaller to obtain a sufficient heat insulating performance.

Heat insulating material 37 is preferably packed after inner box 35 where evaporator pipe 38 is mounted and outer box 36 are disposed in such a manner as to define a space therebetween and heat insulating board 51 is disposed on a side of evaporator pipe 38 which faces outer box 36. As a result, heat insulating material 37 can be packed fully in spaces on upper, lower, left, and right sides of heat insulating board 51 without any gap left, whereby the heat insulating properties around cascade condenser disposition section 39 can be enhanced.

In refrigeration apparatus 1 according to the embodiment that is configured as has been described heretofore, the refrigerants in refrigeration circuit 60 evaporate in evaporator pipe 38, whereby an ultra-low temperature is provided on the circumference of evaporator pipe 38. Thus, cooling compartment 32 surrounded by evaporator pipe 38 can be cooled down via inner box 35 to a low temperature. The heat transmission between first and second cascade condensers 616, 626 and evaporator pipe 38 is interrupted by heat insulating board 51. Consequently, the performance of refrigeration apparatus 1 can be increased.

Here, the function and advantageous effect of refrigeration apparatus 1 according to this embodiment will be described in greater detail by comparing with a refrigeration apparatus of a reference example.

Figure 5:
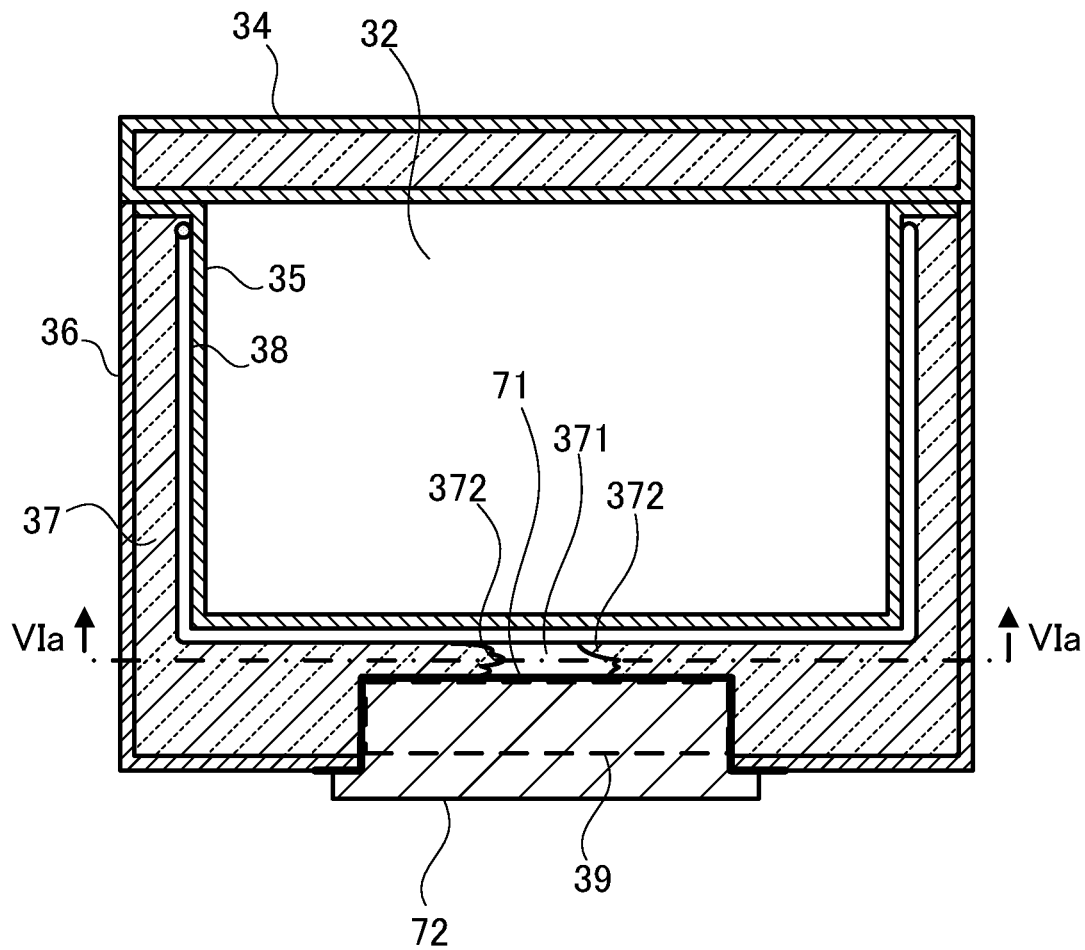
FIG. 5 is a horizontal cross-sectional view of a reference example.

FIG. 5 is a horizontal cross-sectional view of a refrigeration apparatus 1 of a reference example. In refrigeration apparatus 1 according to the reference example, spongy heat insulating material 37, which is supplied in the form of mousse-like liquid and is then solidified to have a number of independent cells, is packed between first and second cascade condensers 616, 626 and evaporator pipe 38. Heat insulating material 37 is packed in such a state that film sheet 71 and jig 72 having shape matching cascade condenser disposition section 39 and disposed in cascade condenser disposition section 39 only when heat insulating material 37 is packed are disposed in cascade condenser disposition section 39, as illustrated in FIG. 5. FIG. 4 is a diagram illustrating a state resulting in the midst of fabrication of refrigeration apparatus 1 according to the reference example, and hence, first cascade condenser 616 and second cascade condenser 626 are not illustrated. These two cascade condensers are disposed in cascade condenser disposition section 39 as done in the embodiment illustrated in FIG. 3 after jig 72 is removed.

In refrigeration apparatus 1 according to the reference example, although a sufficient amount of heat insulating material 37 is desirably packed between film sheet 71 and evaporator pipe 38 at the time of fabrication, a space between jig 72 and evaporator pipe 38 and inner box 35 is narrow. In addition, in refrigeration apparatus 1 according to the reference example, an area of the portion between jig 72 and evaporator pipe 38 and inner box 35 is increased (in other words, a distance over which heat insulating material 37 penetrates is long). Due to this, as illustrated in FIG. 5, a drawback such as non-packed portion 371 where no heat insulating material 37 exists or insufficiently packed portion 372 where heat insulating material 37 is laid out thin is generated between first and second cascade condensers 616, 626 (both not shown) and evaporator pipe 38 due to variation in packing. Consequently, in refrigeration apparatus 1 according the reference example, the heat transmission between first and second cascade condensers 616, 626 and evaporator pipe 38 cannot be reduced sufficiently.

On the contrary to this, in refrigeration apparatus 1 according to this embodiment, heat insulating board 51 having neither a through hole nor a thin portion is disposed between first and second cascade condensers 616, 626 and evaporator pipe 38. Consequently, the heat transmission between first and second cascade condensers 616, 626 and evaporator pipe 38 can be reduced effectively. According to refrigeration apparatus 1 according to this embodiment, irrespective of the size of cascade condenser disposition section 39, that is, the number of cascade condensers disposed or size thereof, or without any possibility of a packing failure in insufficiently packed heat insulating material 37, the heat transmission reduction effect can be obtained.

Figure 6A:
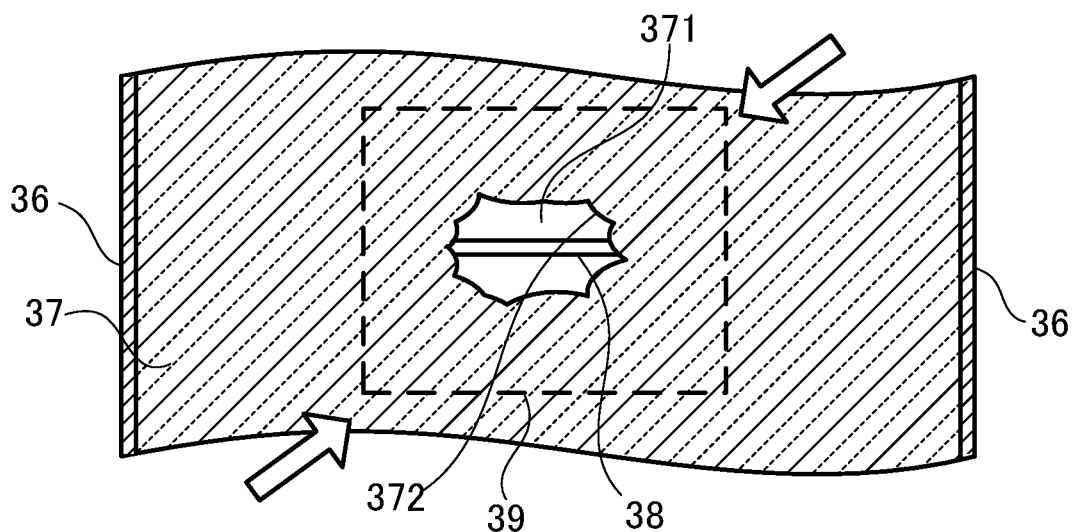
FIG. 6A is a schematic view of a periphery of a cascade condenser disposition portion of the reference example.
Figure 6B:
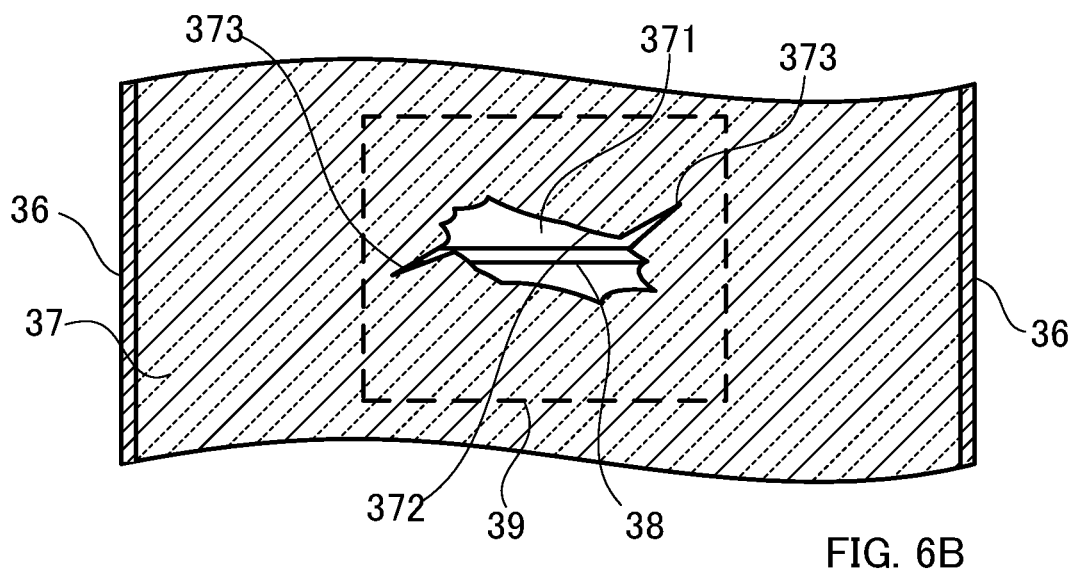
FIG. 6B is a schematic view of the periphery of the cascade condenser disposition portion of the reference example after deformation.

FIG. 6A is a cross-sectional view taken along line VIa-VIa and viewed in a direction indicated by arrows VIa in FIG. 5, illustrating a circumference of cascade condenser disposition section 39. As illustrated in FIG. 6A, in refrigeration apparatus 1 according to the reference example, non-packed portion 371 and insufficiently packed portion 372 exist. Due to this, in the case where during transportation, fabrication or the like, vibrations or impact is applied to refrigeration apparatus 1, and forces indicated by arrows in FIG. 6A are applied to heat insulating material 37 surrounding cascade condenser disposition section 39, heat insulating material 37 is deformed, resulting in possibilities that crack 373 is generated as illustrated in FIG. 6B. Since the heat insulating performance of heat insulating material 37 is reduced by crack 373 so generated, whereby the performance of refrigeration apparatus 1 is further reduced. Additionally, since evaporator pipe 38 that is cooled to a low temperature and an outer side of heat insulating material 37 are caused to communicate with each other via crack 373, a risk of condensation being generated on the circumference of evaporator pipe 38 is increased. Condensed water may trigger corrosion of circumferential metallic members or hydrolyzing of resin members.

Figure 6C:
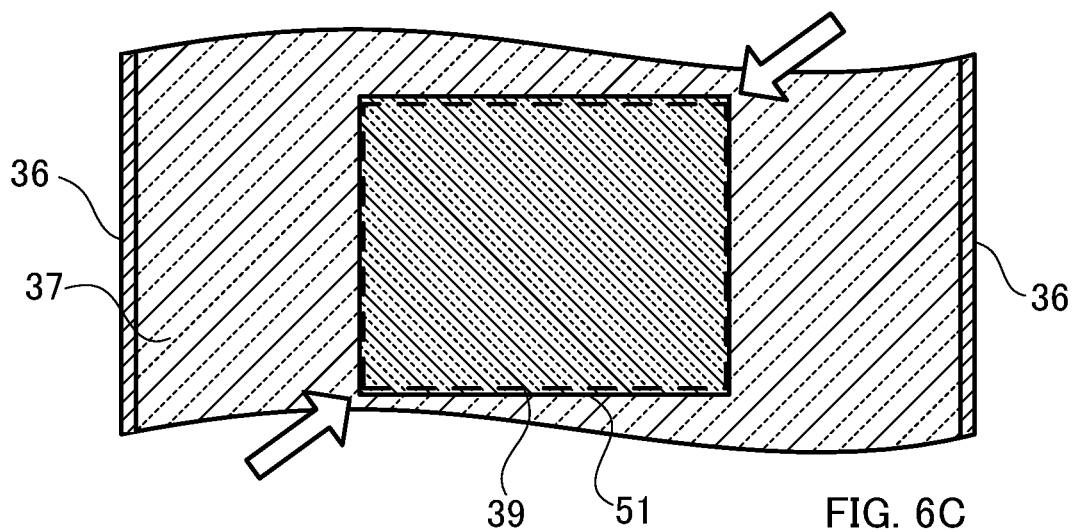
FIG. 6C is a schematic view of a periphery of a cascade condenser disposition portion of the refrigeration apparatus according to the first embodiment.

On the contrary to this, in refrigeration apparatus 1 of this embodiment, heat insulating board 51 is interposed between first and second cascade condensers 616, 626 and evaporator pipe 38. Heat insulating board 51 has neither a through hole nor a thin portion and has high rigidity. Moreover, as illustrated in FIG. 6C which is a cross-sectional view taken along VIc-VIc and viewed in a direction indicated by arrows VIc in FIG. 3 (a periphery of cascade condenser disposition portion 39), packed heat insulating material 37 and heat insulating board 51 are closely secured to each other, generating no gap therebetween. Thus, even though vibration or impact is applied to refrigeration apparatus 1 during transportation, fabrication or the like and forces indicated by arrows in FIG. 6C are applied to heat insulating material 37 surrounding cascade condenser disposition section 39, there are no possibilities that heat insulating material 37 is deformed to be cracked. That is, the mechanical strength of heat insulating material 37 can be enhanced by heat insulating board 51. Hence, a reduction in performance of refrigeration apparatus 1 or deterioration in the constituent members that is attributed to cracking of heat insulating material 37 can be prevented in an ensured fashion.

In refrigeration apparatus 1 according to this embodiment, needless to say, the numbers of refrigeration circuits 60 and cascade condensers that makes up refrigeration circuit 60 are not limited to two, and hence, the numbers of refrigeration circuits 60 and cascade condensers that makes up refrigeration circuit 60 may be one or three or greater.

Embodiment 2

Figure 7:
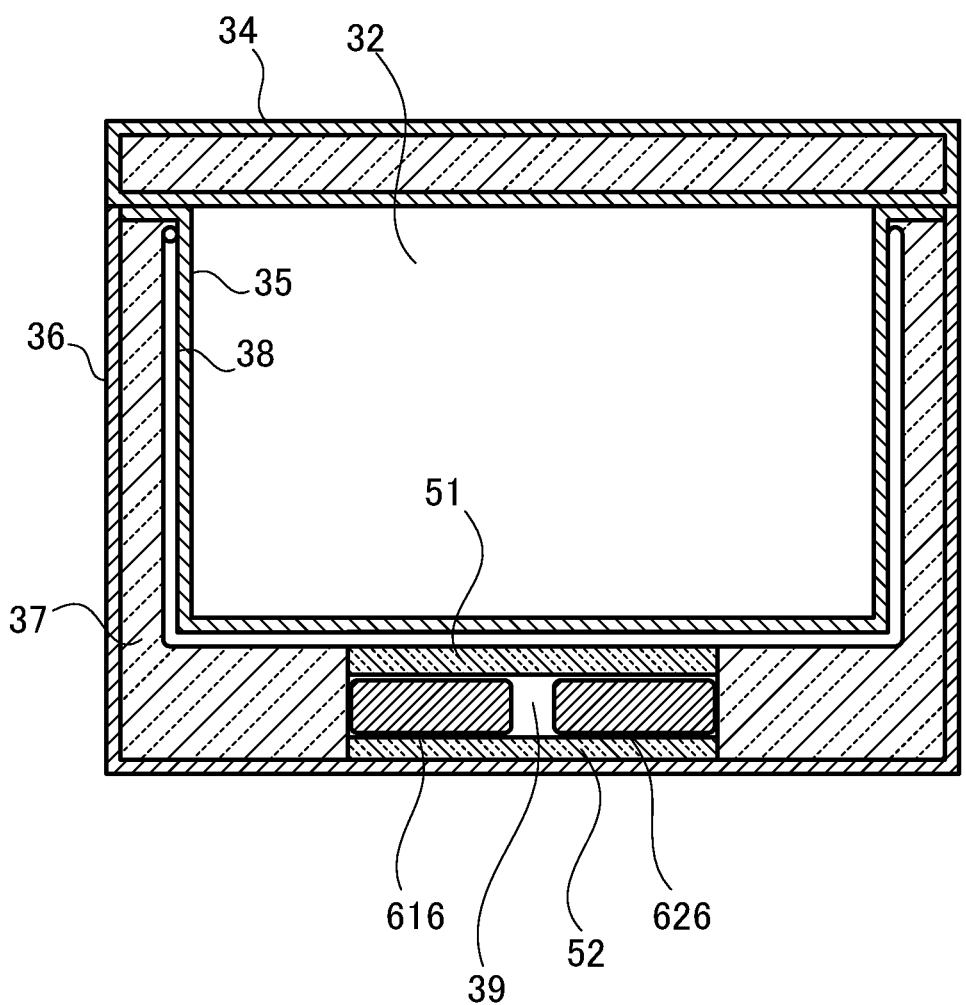
FIG. 7 is a horizontal cross-sectional view of a refrigeration apparatus according to Embodiment 2.

Next, referring to FIG. 7, Embodiment 2 will be described mainly on features different from Embodiment 1. FIG. 7 is a horizontal cross-sectional view of refrigeration apparatus 1 according to this embodiment. First cascade condenser 616 and second cascade condenser 626, which make up refrigeration apparatus 1 of this embodiment, need no service maintenance after fabrication. Due to this, outer box 36 has no hole 361 (refer to FIG. 2). Consequently, refrigeration apparatus 1 according to this embodiment does not have lid 31 that refrigeration apparatus 1 of Embodiment 1 has.

To prevent a heat transmission between first cascade condenser 616 and second cascade condenser 626 and outside air and, hence, a reduction in performance of refrigeration apparatus 1, a heat insulating body in a certain form needs to be disposed between these cascade condensers and outer box 36.

Then, in this embodiment, as illustrated in FIG. 7, second heat insulating board 52 is disposed between first and second cascade condensers 616, 626 and outer box 36. Thus, sufficient heat insulating properties can be obtained while relatively reducing a distance between first and second cascade condensers 616, 626 and outer box 36. Thus, a depth of refrigeration apparatus 1 can be reduced. Consequently, the degree of freedom in placing refrigeration apparatus 1 is increased by reducing a space necessary to place refrigeration apparatus 1, and spaces necessary for transportation and storage can also be reduced.

Second heat insulating board 52 is sized and shaped so that first cascade condenser 616 and second cascade condenser 626 are hidden behind second heat insulating board 52 to become invisible when second heat insulating board 52, first cascade condenser 616, and second cascade condenser 626 are disposed in cascade condenser disposition section 39 and these devices are seen from a rear surface side of refrigeration apparatus 1. Thus, second heat insulating board 52 is interposed between first and second cascade condensers 616, 626 and outside air to interrupt heat transmission therebetween, thereby making it possible to reduce the heat transmission in an ensured fashion.

Second heat insulating board 52 preferably has a thickness of 10 mm to 20 mm. Having the thickness of 10 mm or greater, second heat insulating board 52 can obtain sufficiently great heat insulating properties and mechanical strength (rigidity). Second heat insulating board 52 having the thickness of 20 mm or smaller, a ratio of a space in a thickness direction to a space (cascade condenser disposition section 39) defined between inner box 35 and outer box 36 can be reduced to a relatively small level. In the case where a vacuum heat insulating material is used, with a thickness of the order of 1 mm, sufficient heat insulating properties can be obtained.

Second heat insulating board 52 has preferably a heat transmissivity of 0.050 W/(m·K) or smaller, more preferably a heat transmissivity of 0.030 W/(m·K) or smaller, and much more preferably a heat transmissivity of 0.024 W/(m·K) or smaller to obtain a sufficient heat insulating performance.

Heat insulating material 37 is preferably packed after inner box 35 where evaporator pipe 38 is mounted and outer box 36 are disposed in such a manner as to define a space therebetween and heat insulating board 51, first cascade condenser 616 and second cascade condenser 626, and second heat insulating board 52 are disposed on a side of evaporator pipe 38 which faces outer box 36. As a result, heat insulating material 37 can be packed fully in spaces on upper, lower, left, and right sides of heat insulating board 51, first cascade condenser 616 and second cascade condenser 626, and second heat insulating board 52 without any gap left, whereby the heat insulating properties around cascade condenser disposition section 39 can be enhanced.

In refrigeration apparatus 1 according to the embodiment that is configured as has been described heretofore, the refrigerants in refrigeration circuit 60 evaporate in evaporator pipe 38, whereby an ultra-low temperature is provided on the circumference of evaporator pipe 38. Thus, an interior of cooling compartment 32 surrounded by evaporator pipe 38 via inner box 35 can be cooled down to a low temperature. The heat transmission between first and second cascade condensers 616, 626 and evaporator pipe 38 is interrupted by heat insulating board 51. Further, the heat transmission between the first and second cascade condensers 616, 626 and outside air is interrupted by second heat insulating board 52. Consequently, the performance of refrigeration apparatus 1 can be increased.

Similar to first heat insulating board 51, second heat insulating board 52 can also provide an advantageous effect of increasing the mechanical strength of heat insulating material 37.

Embodiment 3

Figure 8:
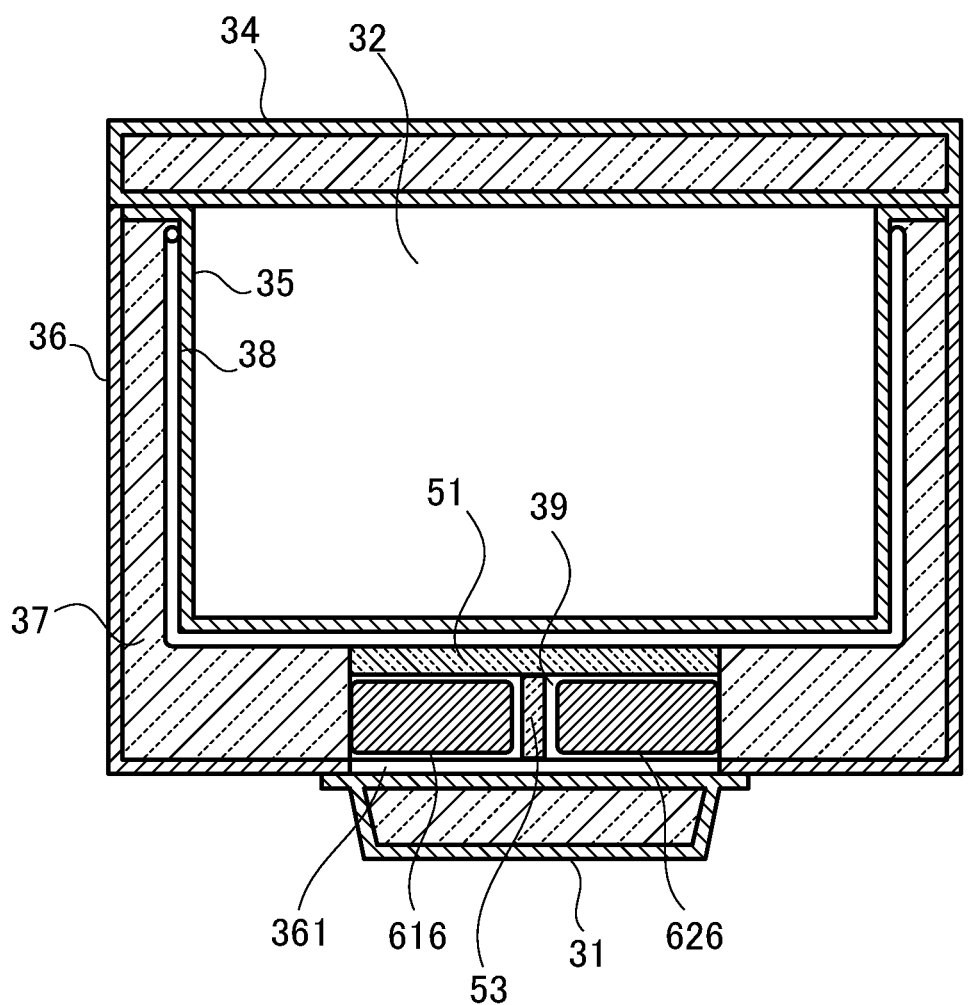
FIG. 8 is a horizontal cross-sectional view of a refrigeration apparatus according to Embodiment 3.

Next, referring to FIG. 8, Embodiment 3 will be described mainly on features different from Embodiment 1. FIG. 8 is a horizontal cross-sectional view of refrigeration apparatus 1 according to this embodiment. In refrigeration apparatus 1 according this embodiment, first cascade condenser 616 and second cascade condenser 626 are disposed laterally side by side within cascade condenser disposition section 39.

In the case where an operating condition such as an attaining target temperature or refrigerant flow rate differs between first refrigeration circuit 610 and second refrigeration circuit 620, a temperature of a refrigerant flowing through an interior of first cascade condenser 616 and a temperature of a refrigerant flowing through an interior of second cascade condenser 626 come to differ from each other. As this occurs, there are caused possibilities that a heat transmission is generated between first cascade condenser 616 and second cascade condenser 626. In the event that such a heat transmission is generated, there are caused possibilities that the performance of refrigeration apparatus 1 is reduced.

Then, in refrigerant apparatus 1 according to this embodiment, third heat insulating board 53 is disposed between first cascade condenser 616 and second cascade condenser 626. Thus, a heat transmission between first cascade condenser 616 and second cascade condenser 626 is reduced, thereby making it possible to improve the performance of refrigeration apparatus 1.

Third heat insulating board 53 is sized and shaped so that one of first cascade condenser 616 and second cascade condenser 626 is hidden behind third heat insulating board 53 to become invisible when third heat insulating board 53, first cascade condenser 616, and second cascade condenser 626 are disposed in cascade condenser disposition section 39 and these devices are seen from a lateral surface side of refrigeration apparatus 1. Thus, third heat insulating board 53 is interposed between first cascade condenser 616 and second cascade condenser 626 to interrupt heat transmission therebetween, thereby making it possible to reduce the heat transmission in an ensured fashion.

Third heat insulating board 53 preferably has a thickness of 10 mm or greater. Having the thickness of 10 mm or greater, third heat insulating board 53 can obtain sufficiently great heat insulating properties and mechanical strength (rigidity). In the case where a vacuum heat insulating material is used, with a thickness of the order of 1 mm, sufficient heat insulating properties can be obtained.

Third heat insulating board 53 has preferably a heat transmissivity of 0.050 W/(m·K) or smaller, more preferably a heat transmissivity of 0.030 W/(m·K) or smaller, and much more preferably a heat transmissivity of 0.024 W/(m·K) or smaller to obtain a sufficient heat insulating performance.

In refrigeration apparatus 1 according to this embodiment, three or more cascade condensers may be disposed. In this case, third heat insulating board 53 is preferably disposed in each of spaces defined between the cascade condensers. As a result, a heat transmission among the cascade condensers can be reduced in an ensured fashion.

Embodiment 4

Figure 9:
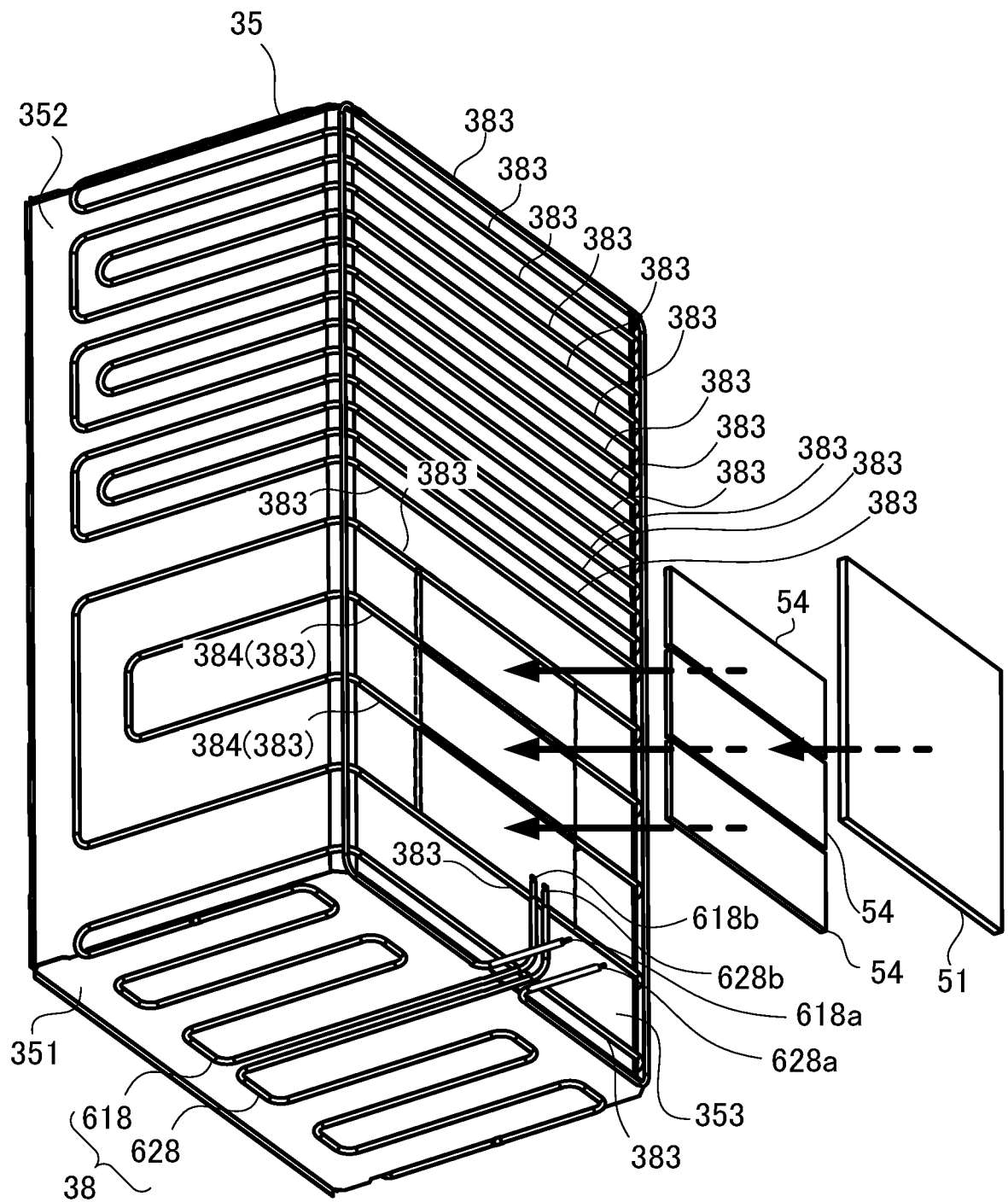
FIG. 9 is an internal structural view of a refrigeration apparatus according to Embodiment 4.

Next, referring to FIG. 9, Embodiment 4 will be described mainly on features different from Embodiment 1. FIG. 9 is a perspective view of inner box 35 as viewed from a rear surface side and below inner box 35. FIG. 9 illustrates heat insulating board 51 and straight pipe section restricting members 54 before they are assembled to refrigeration apparatus 1. Straight pipe section restricting members 54 after assembled are also illustrated in FIG. 9 while being indicated by broken lines.

Evaporator pipe 38 includes multiple straight pipe sections 383 (constituting part of first evaporator pipe 618 and part of second evaporator pipe 628) that are provided parallel to one another and are equally spaced apart from one another on rear surface 353 of inner box 35. In refrigeration apparatus 1 according to this embodiment, intervals at which straight pipe sections 383 are disposed at an upper part of the rear surface of inner box 35 are narrower than intervals at which straight pipe sections 383 are disposed at a lower part of the rear surface of inner box 35. In multiple straight pipe sections 383, two opposite straight pipe sections 384, which lie opposite to each other via first cascade condenser 616, second cascade condenser 626 and heat insulating board 51, are disposed between inner box 35 and first and second cascade condensers 616, 626, which are not illustrated, that is, between inner box 35 and heat insulating board 51.

Refrigeration apparatus 1 of this embodiment includes three straight pipe section restricting members 54 configured to restrict the positions of straight pipe sections 383. Straight pipe section restricting members 54 are rectangular plate-like members, when seen from the front, having the same dimensions, and a thickness of straight pipe section restricting members 54 is almost equal to an outer diameter of straight pipe section 383 and is, for example, 10 mm. Straight pipe section restricting members 54 have sufficient rigidity to restrict the positions of straight pipe sections 383.

In refrigeration apparatus 1 according to this embodiment, straight pipe section restricting members 54 are tiled between straight pipe sections 383 so as to be isolated by straight pipe sections 383 and are then fixed in predetermined positions on rear surface 353 of inner box 35 with, for example, adhesive tapes or the like. Thus, straight pipe sections 383 can easily be disposed at equal intervals relative to one another in the predetermined positions. Consequently, an interior of cooling compartment 32, not illustrated, can be cooled uniformly. The number of straight pipe section restricting members 54 is not, needless to say, limited to three.

A member that makes up straight pipe section restricting member 54 is preferably made up of a heat insulating body that can reduce a heat transmission between inner box 35, that is, cooling compartment 32 and first and second cascade condensers 616 and 626 such as a member having the same structure as heat insulating board 51. With straight pipe section restricting member 54 configured in that way, the heat transmission between cooling compartment 32 constituting a cooling target and first and second cascade condensers 616 and 626 can be reduced to thereby enhance the performance of refrigeration apparatus 1.

In this embodiment, heat insulating board 51 is disposed so as to cover opposite straight pipe sections 384 and straight pipe section restricting members 54.

Figure 10:
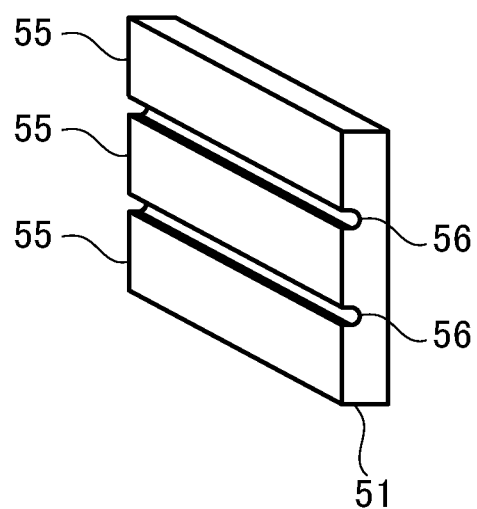
FIG. 10 is a perspective view of an insulating board of a modified example.

FIG. 10 illustrates a modified example of heat insulating board 51 provided on refrigeration apparatus 1 according to this embodiment. Heat insulating board 51 illustrated in FIG. 10 includes three projecting sections 55. In other words, heat insulating board 51 includes two grooves 56. Projecting sections 55 function as straight pipe section restricting members. That is, projecting sections 55 project from heat insulating board 51 to between straight pipe sections 383 illustrated in FIG. 9 to restrict the positions of adjacent straight pipe sections 383. In other words, opposite straight pipe sections 384 are inserted into grooves 56, whereby the positions of straight pipe sections 383 including opposite straight pipe sections 384 are restricted. Thus, according to this heat insulating board 51, straight pipe sections 383 can be restricted to stay in the predetermined positions to thereby cool cooling compartment 32, not illustrated, uniformly. Additionally, according to this heat insulating board 51, compared with the case where straight pipe section restricting members 54 are tiled, a gap defined between grooves 56 of heat insulating board 51 and straight pipe sections 383 becomes smaller. This can reduce the heat transmission between cooling compartment 32, which constitutes a cooling target, and first and second cascade condensers 616 and 626 to thereby further enhance the performance of refrigeration apparatus 1. Moreover, when compared with the case where straight pipe section restricting members 54 and heat insulating board 51 are configured as separate bodies as illustrated in FIG. 9, since this heat insulating board 51 is the single member, heat insulating board 51 provides an advantage that the placing work can be performed easily and simply.

Heat insulating board 51 may be a member in which a plate-like member like a cushion material that easily deforms so as to match the shape of straight pipe sections 383 when pressed against straight pipe sections 383 is laminated on a plate-like member having a rigidity.

Needless to say, the refrigeration apparatus according to the present invention is not limited to the embodiments that have been described above and hence can be altered or modified variously. For example, any two or more in second heat insulating board 52, third heat insulating board 53 and straight pipe section restricting member 54 may be used in parallel in the refrigeration apparatus.

The details of the disclosure of the specification, claims, drawings and abstract that are included in Japanese Patent Application No. 2017-101960 filed on May 23, 2017 are incorporated herein by reference in its entirety.

INDUSTRIAL APPLICABILITY

According to the present invention, the refrigeration apparatus can be provided in which the heat transmission between the cascade condensers and the evaporator can be reduced. Thus, the industrial applicability thereof is great.

REFERENCE SIGNS LIST

1 Refrigeration apparatus
2 Machine installing section
3 Main body
31 Lid
32 Cooling compartment
33 Hinge
34 Door
35 Inner box
351 Lower surface
352 Right surface
353 Rear surface
36 Outer box
361 Hole
37 Heat insulating material
371 Non-packed portion
372 Insufficiently packed portion
373 Crack
38 Evaporator pipe
383 Straight pipe section
384 Opposite straight pipe section
39 Cascade condenser disposition section
51 Heat insulating board
52 Second heat insulating board
53 Third heat insulating board
54 Straight pipe section restricting member
55 Projecting section
56 Groove
60 Refrigeration circuit
610 First refrigeration circuit
611 First compressor
611a First oil cooler
611b first annular piping
612 First pre-condenser
613 First condenser
614 First separator
615 First auxiliary decompression device
616 First cascade condenser
616a First outer pipe
616b First inner pipe
617 First decompression device
618 First evaporator pipe
618a First evaporator pipe inlet
618b First evaporator pipe outlet
619 First common fan
620 Second refrigeration circuit
621 Second compressor
621a Second oil cooler
621b Second annular piping
622 Second pre-condenser
623 Second condenser
624 Second separator
625 Second auxiliary decompression device
626 Second cascade condenser
626a Second outer pipe
626b Second inner pipe
627 Second decompression device
628 Second evaporator pipe
628a Second evaporator pipe inlet
628b Second evaporator pipe outlet
629 Second common fan
71 Film sheet
72 Jig

The invention claimed is:

1. A refrigeration apparatus, comprising:
an evaporator that makes up a refrigeration circuit;
a first cascade condenser that makes up the refrigeration circuit;
a heat insulating board disposed between the evaporator and the first cascade condenser; and
a heat insulating material disposed around the heat insulating board and packed in spaces on upper, lower, left and right sides of the heat insulating board,
wherein the heat insulating material is in contact with the heat insulating board.

2. The refrigeration apparatus according to claim 1, further comprising a second heat insulating board disposed in a position where the second heat insulating board holds the first cascade condenser together with the heat insulating board in between.

3. The refrigeration apparatus according to claim 1, further comprising a second cascade condenser.

4. The refrigeration apparatus according to claim 3, further comprising a third heat insulating board disposed between the first cascade condenser and the second cascade condenser.

5. The refrigeration apparatus according to claim 1, wherein
the evaporator is an evaporator comprising a plurality of straight pipe sections which are parallel to each other, and
the refrigeration apparatus further comprises a straight pipe section restricting member disposed between the straight pipe sections.

6. The refrigeration apparatus according to claim 5, wherein the straight pipe section restricting member is a heat insulating member.

7. The refrigeration apparatus according to claim 5, wherein the straight pipe section restricting member is a projecting section that projects between the straight pipe sections from the heat insulating board.

8. The refrigeration apparatus according to claim 1, wherein the heat insulating material is packed fully in the spaces without any gap left.

* * * * *